Aug. 19, 1958     A. J. MATTER     2,847,796
ADJUSTABLE APPLIANCE CASTERS WITH WOBBLE STOP
AND LOAD SUPPORT FOR SOFT FLOORS
Filed April 7, 1955     2 Sheets-Sheet 1
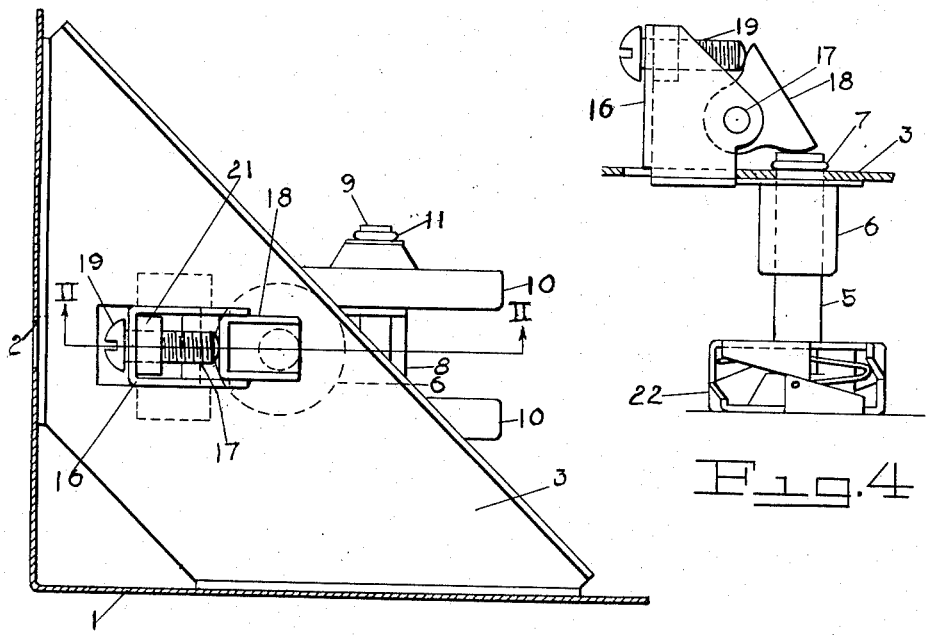
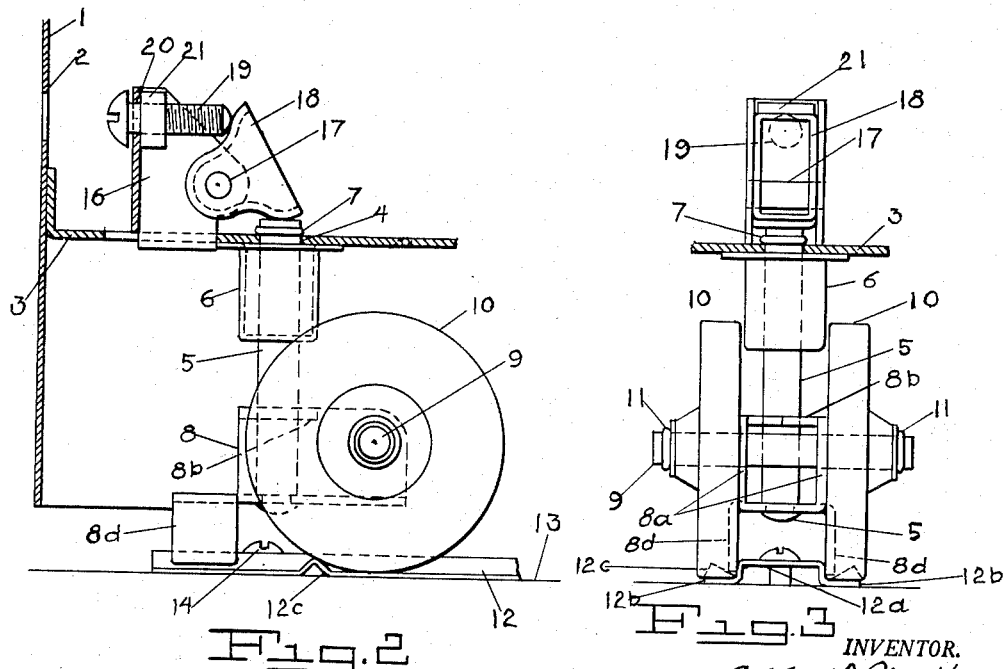
INVENTOR.
Albert J. Matter Aug. 19, 1958
A. J. MATTER
2,847,796
ADJUSTABLE APPLIANCE CASTERS WITH WOBBLE STOP
AND LOAD SUPPORT FOR SOFT FLOORS
Filed April 7, 1955
2 Sheets-Sheet 2
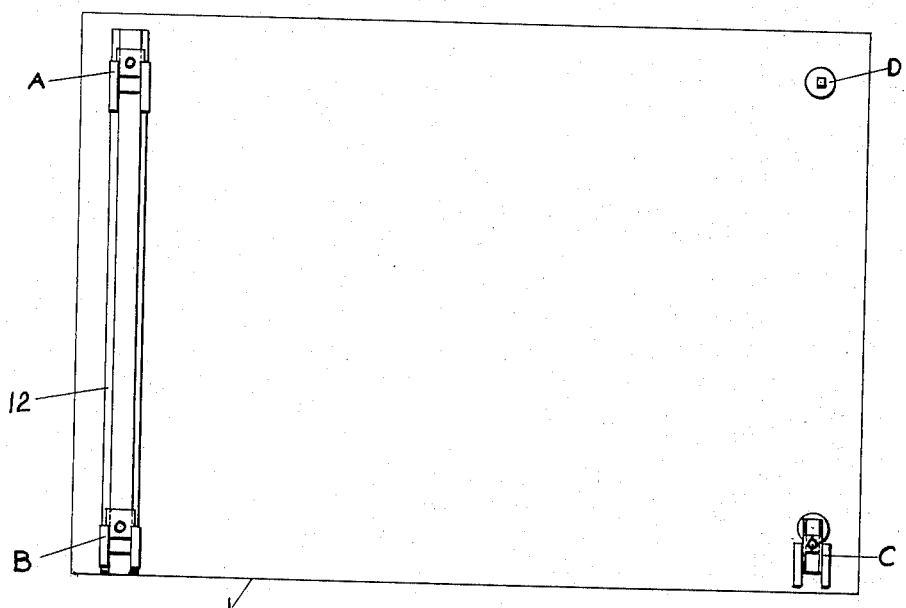
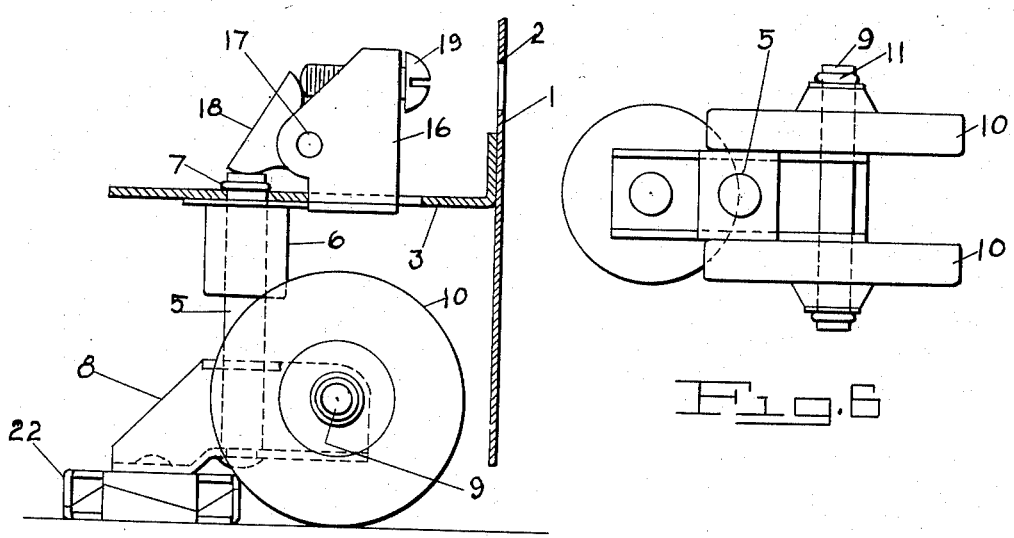
INVENTOR.
Albert J. Matter various# United States Patent Office 2,847,796
Patented Aug. 19, 1958

2,847,796

ADJUSTABLE APPLIANCE CASTERS WITH WOBBLE STOP AND LOAD SUPPORT FOR SOFT FLOORS

Albert J. Matter, Park Ridge, Ill.

Application April 7, 1955, Serial No. 499,857

2 Claims. (Cl. 45—139)

This invention relates to improvements in adjustable appliance casters with wobble stop and load support for soft floors, and has for its object to provide adjustable casters adapted to raise or lower appliances such as ranges, washing machines and the like for the purpose of lining up the tops thereof to a common level.

Another object is to provide such casters with means for separately adjusting the height of each corner of an appliance for the purpose of leveling the top of the appliance.

Another object is to provide such means inside an appliance but accessible for adjustment with a screw driver or key inserted through holes in the side walls of the appliance.

Another object is to provide means for guiding an appliance into a limited space between other appliances or cabinets, for the purpose of installation or for removing or replacing an appliance when repairing, cleaning or decorating.

Another object is to prevent wobble of the appliance after installation, without depending on accurate adjustment of the several adjustable casters.

Still another object is to provide load supporting means having greater floor contacting surface than a caster roller when used on a relatively soft floor such as soft rubber.

I attain these objects by means of the devices shown in the accompanying drawings in which:

Fig. 1 is a plan view showing a rail guided swivel caster mounted on a gusset attached within an appliance.

Fig. 2 is a side elevation of the same, partially in cross section on the line II—II in Fig. 1.

Fig. 3 shows a front elevation of the parts shown in Figs. 1 and 2.

Fig. 4 illustrates a wobble stopping device and its adjusting means, in side elevation.

Fig. 5 is a side elevation of an adjustable caster having an attached wobble stop and load support.

Fig. 6 shows a plan view of the caster shown in Fig. 5.

Fig. 7 is a diagrammatic layout of the outline of an appliance showing the relative positions of the several devices illustrated.

Like numerals of reference indicate similar parts throughout the several views.

1 indicates walls of an appliance cabinet with a hole provided at 2 for screw driver access to an adjusting screw.

At 3 is shown a corner gusset attached, as by welding, to walls 1 of the cabinet.

Referring to Figs. 1, 2 and 3, a hole is provided at 4 in gusset 3 for the slideable reception of a caster stem 5 which is guided vertically by a bearing 6 attached, as by welding, to gusset plate 3. At 7 a snap ring is shown to limit downward movement of said stem 5. At the bottom of stem 5 a roller and guide bracket 8 is attached. This is shown U-shaped and provided with orifices at 8a to receive an axle pin 9 and has inwardly bent portions 8b surrounding said stem 5 which is shown riveted to the bottom of bracket 8 at 5a. Bracket 8 is also provided with downturned guide wings 8d.

On axle pin 9 two rollers 10 are rotatably mounted and held in place by snap rings 11.

A guide rail is shown at 12 preferably formed of sheet metal, with a raised central guide portion 12a and roller supporting flanges 12b. As shown in Figs. 2 and 3 the rollers 10 and guide wings 8d straddle guide portion 12a and rollers 10 rest on flanges 12b, thus directing the movement of the rollers along the guide rail and preventing their turning in relation to the guide rail which may be attached to the floor 13 as by screws 14. To limit backward movement of an appliance mounted on the aforesaid guide rail, either by pushing or due to slamming of oven doors and the like, the guide rail flange is shown with raised stops 12-C.

To adjust the casters to raise or lower an appliance corner an adjuster housing is provided at 16 and attached to gusset 3 by welding or otherwise and holds a cross pin 17 on which a fulcrum 18 is pivotally mounted. Fulcrum 18 is pressed against the top end of caster stem 5 by means of an adjusting screw 19 which is held in an orifice 20 provided in housing 16 and is screwed through a square nut 21.

By inserting a screw driver or key through hole 2 and engaging screw 19 adjustment of the casters can be made from outside the cabinet of an enclosed appliance.

In Fig. 4 is shown an automatic wobble stopper 22 as described in my Patent #2,682,131 dated June 29, 1954. In the preferred size shown this is automatically adjustable in height about ¼ inch and as it may require greater adjustment in some instances, I show this mounted on a stem 5 provided with adjusting means similar to that just described and shown in Figs. 1, 2 and 3. This may thus be roughly raised or lowered in extreme instances so as to bring it within its normal automatic operating scope.

Referring now to Figs. 5 and 6, it will be noted that the general construction of this unit is similar to that shown in Figs. 1, 2 and 3 except that guide wings 8d have been eliminated and this end of bracket is here formed to support an automatic wobble stopper 22 described in the preceding paragraph. When used as shown with caster rollers this wobble stopper serves also as a load supporter. When an appliance is being moved about, the lower half of the wobble stopper automatically turns and raises or lowers to follow irregularities in the floor over which it travels. However when the appliance is stationary the wobble stopper 22, due to floor friction will remain stationary and supports loads of many times the weight of an appliance. This is a great help in taking the load off of the casters which would normally sink deeper and deeper into a soft floor after standing for some time due to the very limited area of contact between a roller and a flat surface. Likewise the guide rail flange is designed to spread the appliance weight over a much greater floor surface than that provided by a roller.

The unit shown in Figs. 1, 2 and 3 is preferably provided with a round stem 5 permitting the caster to swivel when not on the guide rail. Without the guide rail it would travel properly to the left as shown in Fig. 2 but when moved to the right as when removing an appliance from its space between two other appliances or cabinets the caster would swivel and force the appliance to one side or the other and cause it to jamb against the adjoining appliance or cabinet and thus prevent its removal. For the purpose of later description I designate this unit as "unit A."

"Unit B" designates a similar unit but with a square caster stem 5 slideably mounted in a square orificed bearing 6 thus making it a plain non-swivelling caster.

"Unit C" is shown in Figs. 5 and 6 and preferably has a round stem to permit swivelling but this may be square and non-swivelling.

"Unit D" is illustrated in Fig. 4 and has a square stem, to prevent its turning.

Fig. 7 shows the outline of an appliance or cabinet with units A, B, C and D indicated in operating positions when attached thereto. A guide rail 12 is shown attached to the floor by means of screws or otherwise.

It is obvious that these positions may be altered as desired without affecting the usefulness of the combination shown.

In use, the preferred procedure is as follows:

(1) Attach the guide rail to the floor in the desired position.

(2) Move the appliance or cabinet on its casters to a position just outside of the space into which it is to be installed.

(3) Make the electrical or other connections ready for operation.

(4) Adjust units A and D to the desired heights.

(5) Adjust units B and C so that the appliance or cabinet top at the front is lower than at the back.

(6) Slide the appliance onto the guide rail and into its intended position.

(7) Adjust unit B to level the appliance top from front to back.

(8) Adjust unit C to level the appliance top from left to right. This will raise unit D and permit the lower shoe portion thereof to rotate and take the load at the point so as to prevent wobble.

When it is desired to remove an installed appliance for the purpose of repairing, cleaning or decorating, it is now only necessary to pull the appliance out and later return it without further adjustment.

The co-ordinated effect of the several units working together as a set makes it possible to attain the aforesaid objectives.

I claim:

1. In combination, an appliance, a supporting device underneath and provided with a stem extending slidably up into the appliance, a rocker element in the appliance above and in contact with the top of the stem, a pivot pin securing said element to the appliance, and a screw accessible from the exterior of the appliance engaging said element to adjust the angular position thereof and the vertical position of the stem relative to the appliance.

2. In combination, a gusset plate adapted to be attached to the lower part of an appliance so as to occupy a horizontal position, a supporting device below the plate and having a stem extending up through the same in slidable relation thereto, a stationary member on top of the plate beside the stem, a rockable element secured to said member by a pivot in position to cause one end of said element to rest on top of the stem, and a screw extending through said member and pressing against one side of said element to limit the upward rocking movement of the latter.

References Cited in the file of this patent

UNITED STATES PATENTS

| | | |
|---|---|---|
| 751,489 | Etheridge | Feb. 9, 1904 |
| 1,032,970 | Vanderveld | July 16, 1912 |
| 2,134,444 | Harsh | Oct. 25, 1938 |
| 2,149,389 | Cantlo | Mar. 7, 1939 |
| 2,472,514 | Brinkley | June 7, 1949 |
| 2,541,514 | Herold | Feb. 13, 1951 |
| 2,682,131 | Matter | June 29, 1954 |

FOREIGN PATENTS

| | | |
|---|---|---|
| 4,229 | Great Britain | Oct. 23, 1878 |
| 467,565 | Germany | Oct. 29, 1928 |